8715X
M. RICH.
LEVER SAWMILL DOG.
Patented Mar. 25, 1835.
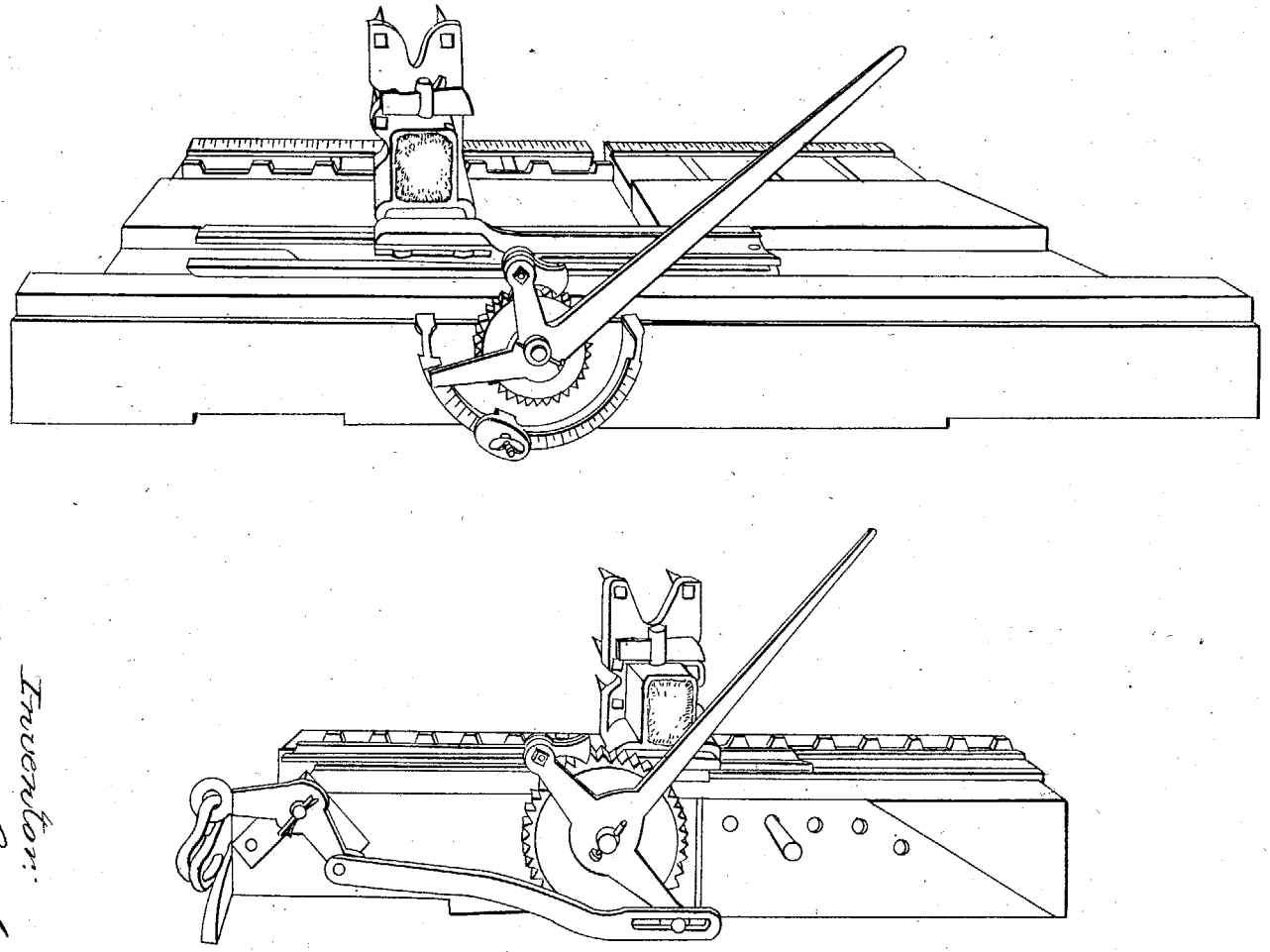
Inventor:
Morton Rich 8715X Mar 25. 1835 209

Martin Rich. Caroline. New York.

Letters Patent March 25. 1835.

The Schedule referred to in these Letters Patent and making part of the same, containing a description in the words of the said Martin Rich himself, of his improvement in Saw Mill Dogs, called the "improved lever Saw Mill Dog."

To all to whom these presents shall come: Be it Known, that I, Martin Rich, of the Town of Caroline in the County of Tompkins have invented a new and useful improvement in Saw Mill Dogs, called the "improved Lever Saw Mill Dog," and that the following is a full and exact description of the construction and operation of the said machine as invented or improved by me.

First. Two Iron ways five feet long, placed upon the head or tail blocks of the Saw, five inches apart, with grooved edges upon the inside. A rack composed of cast iron three feet in length with teeth upon the under side with grooved sides, is placed between the iron ways & slides in the ways upon the top of the Rack: near the ends is placed a piece of cast iron (either cast upon the rack solid, or fastened with wrought iron bolts) twelve inches in length, with edges for the dog to slide upon, and in which is a square hole, eight inches long and one inch and a quarter wide, for the head of the screw to play in that fastens the dog. An upright cast iron or wrought iron dog, eight inches long, eight inches high & six inches wide, with grooved edges to run on the edges of the pieces on top of the rack with a hole through the centre of the bottom part of the dog, in which is placed a screw and hand nut that confines the dog to the piece of cast iron placed upon the Rack. In the upright part of the dog are six holes three fourths of an inch square, in which are placed wrought teeth, firmly rivetted and placed upon the inward face of the dog towards the saw and are made of iron — On the inside of the blocks towards the saw are Notched iron plates, one inch thick, two feet long each; on the back side of the block from the saw, is a pinion which works in the teeth of the rack before described, on the shaft of which is placed a ratchet wheel or notched wheel. The wheel is to be turned by a lever moving loosely on the shaft of the pinion with a small [illegible] made of iron attached to the lever to catch the teeth of the wheel. and may be reversed to turn it either way. and in this manner moving the rack at pleasure and the lever is moved by the hand of the sawyer. On the outside of the Blocks near the end is an upright piece, two feet high, four inches wide and three inches thick (if made of wood.) or one inch thick if made of iron, and it may be made of either. in which is bored holes, which serves to guage the thickness of the board or plank to be sawed. by placing in them a pin on which the handle of the lever rests; on the under side of the block, either head or tail, or both, as thought best, near the ends is placed a piece of grooved iron; two feet long two inches wide and one inch thick, is firmly bolted or spiked. On the top of the Saw Mill carriage is placed a rack or notched plate made of cast or wrought iron, two feet long, with an edge raised on one side half an inch high, which plays in the grooved iron placed on the under side of the block. Upon the back side of the block is placed a hand that sets into the notched iron or rack to keep the block from slipping back or out of place and prevents the log from falling from the carriage.

The improvement claimed by your Petitioner is the piece of cast or wrought iron placed upon the top of the rack; and the upright Dog & teeth which is fastened to the same and the screw and hand nut which fastens the dog to the plate. and the Notched iron plates placed upon the front side of the block towards the screw, and the post that is fastened on the head block, near the end, ~~and~~ is described as an upright piece, two feet high, four inches wide and three inches thick, if made of wood, or one inch thick if made of iron in which is bored holes which serve to guage the thickness of the board or plank to be sawed. and the piece of grooved iron two feet long, two inches wide and one inch thick, described as firmly bolted to the head or tail block, and also the rack described as placed upon the top of the Saw Mill carriage, and called a rack or notched plate, and the hand on the back side of the block that plays or sets into the notched plate or rack. — In Witness whereof, I have hereto set my hand & name this twenty third day of February 1835.

Witnesses
John Stephens
Frederick G. Stanley

Martin Rich

Exd
W.G.

(Drawing restored Jany. 6. 1843).

(966 words) [illegible]